Aug. 10, 1926.
E. W. DAVIS
1,595,292
LUBRICATING SYSTEM
Filed July 16, 1925     2 Sheets-Sheet 1
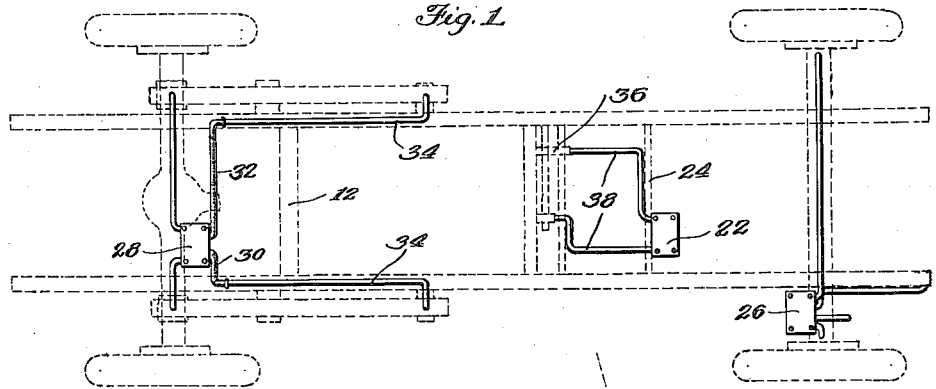
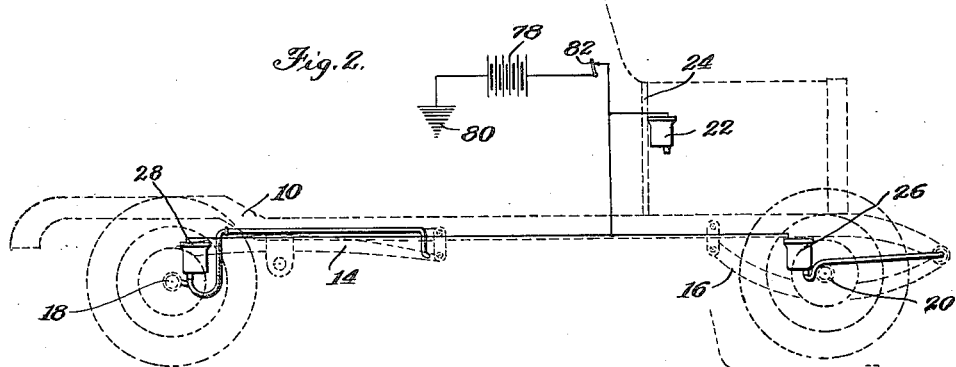
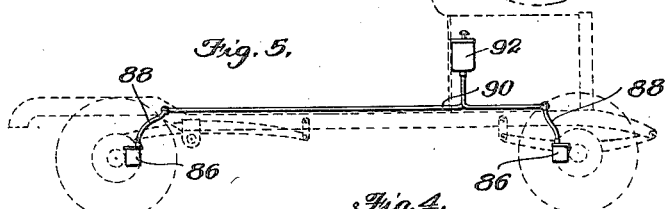
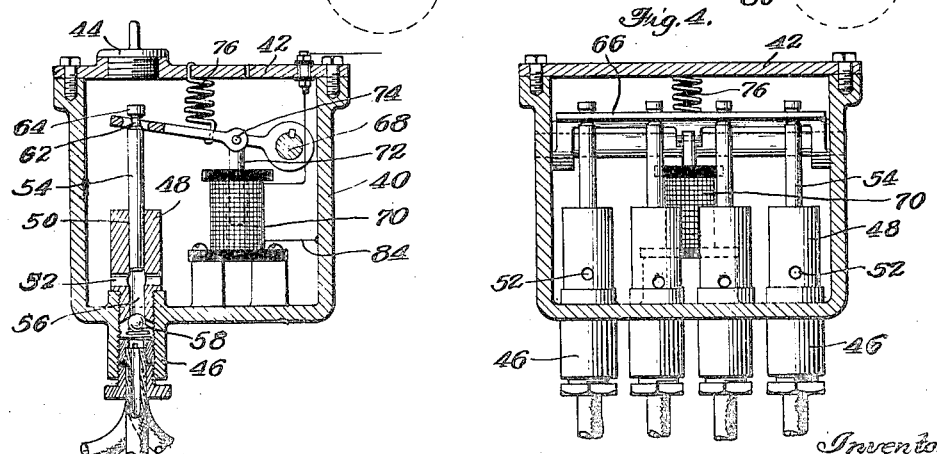
Inventor
Ernest W. Davis
By Pierce and Sweet Attys.

Aug. 10, 1926.  
E. W. DAVIS  
LUBRICATING SYSTEM  
Filed July 16, 1925  
1,595,292  
2 Sheets-Sheet 2

Inventor  
Ernest W. Davis  
By Pierce and Sweet  
Attys.

Patented Aug. 10, 1926.

1,595,292

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

LUBRICATING SYSTEM.

Application filed July 16, 1925. Serial No. 43,989.

My invention relates to improvements in lubricating systems, and more particularly to a novel type of lubricating system for lubricating the chassis bearings of automotive vehicles.

At the present time, several different types of systems are in use, among which is the so-called centralized type. In some systems of this type, a single pump supplies lubricant to all the chassis bearings through individual conduits, with means either in the pump or at the ends of the conduits for determining the amount of lubricant fed to each bearing upon each operation.

In another system of this type, a single conduit passes by a plurality of bearings, and branches lead from the single conduit to each individual bearing. In this case it is imperative to locate the apportioning means adjacent each bearing.

The system employing individual conduits is objectionable on account of the length of the conduits and the difficulty and expense of installing them and keeping them in condition, and the branched conduit system has been found more or less unreliable.

The objects of the present invention are:

First, to eliminate the excessive amount of conduit involved in the individual conduit system, and at the same time avoid the inaccuracies of the branched conduit system. I accomplish this primarily by subdividing the pumping means into several units, each supplying a plurality of bearings in the same portion of the chassis, so that the conduits are much shortened, without making the number of the pumping units excessive.

Second, to employ subsidiary pumping units for the distribution of lubricant, but at the same time to fill the entire system at one filling point.

Third, to provide subsidiary pumping units completely sealed. This is a great advantage, both in connection with the accomplishment of the second object and for protection against contamination of the lubricant.

Fourth, to condition the operation of the lubricating system on the operativeness of another essential part of the equipment of the vehicle.

Further objects and advantages of the invention will become apparent as the description proceeds.

In the accompanying drawings:

Figure 1 is a more or less diagrammatic plan view of a system according to the invention, indicating the application thereof to a motor vehicle.

Figure 2 is a side elevation of the showing of Figure 1.

Figure 3 is a section through a pumping unit according to the invention.

Figure 4 is a section of the same unit on line 4—4 of Figure 3.

Figure 5 is a side elevation similar to Figure 2, indicating the additional structure necessary to provide for filling at one point only.

Figure 6:
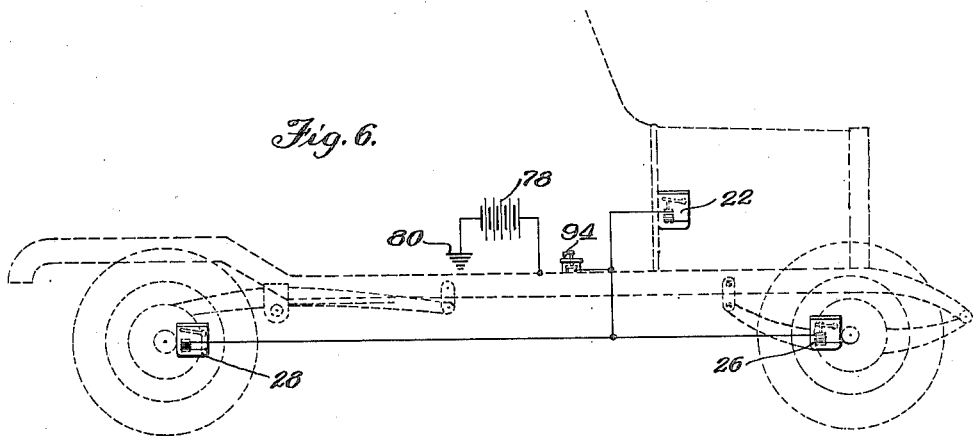
Figure 6 is a side elevational diagram of a system conditioned for its operation on the operativeness of another part of the equipment.

In the embodiment of the invention selected for illustration in Figures 1 to 5 inclusive, the system has been shown applied to a conventional motor vehicle comprising a frame made up of side members 10 and cross braces 12. The frame is carried on rear springs 14 and front springs 16, which are in turn supported by the rear axle 18 and the front axle 20. According to the invention, a body pumping unit 22 is mounted on the frame, preferably on the front of the dash board 24, a front axle unit 26 is mounted on the front axle and a rear axle unit 28 on the rear axle. All the parts requiring lubrication are then subdivided into three groups, each group including all the bearings that can most conveniently be lubricated from one of the three units. It will be apparent that the primary consideration in grouping the bearings is proximity to the unit. Relative movement between the bearings and the unit is a second factor to be taken into consideration.

Thus the front ends of the rear springs have been illustrated as receiving lubrication from the rear axle unit 28 through flexible conduits 30 and 32 and rigid conduits 34, while the bearings for the brake transmission at 36 are lubricated through conduits 38 from the body unit 22.

Referring now to Figures 3 and 4, a unit comprises a combined reservoir and casing 40 provided with a tight fitting cover 42 having a filling aperture and closure plug 44. The bottom of the casing provides a plurality of exit bosses 46. A cylinder body 48 is threaded into the upper end of each exit boss, and has a vertical bore 50 and a transverse bore 52 forming inlet ports to be closed by the plunger 54, after which the contents of the cylinder proper at 56 will be ejected past check valve 58 and out through the discharge conduit 60.

The upper end of each plunger 54 is reduced at 62, above which is an enlarged head 64. The portions 62 are received in suitable loosely fitting apertures in a rocker plate 66 pivoted on a pintle 68. To actuate the rocker plate I provide a solenoid 70 for pulling down the core 72 pivoted to the rocker plate at 74. When the solenoid is not energized, tension spring 76 will lift the rocker plate to the position shown in Figures 3 and 4.

A suitable source of electrical energy is indicated at 78, being preferably the storage battery carried by the motor vehicle for starting, lighting and ignition purposes. In the wiring arrangement of Figure 2, this battery is grounded at 80, and connected to a switch 82 from which conductors lead in parallel to all three pumping units, the current flowing through the solenoids 70 of each unit back to ground at 84, see Figure 3.

In the arrangement of pumping units shown in Figure 2, each pumping unit contains its own supply of lubricant. It will be obvious that the electrical connections for delivering energy to the inside of the unit can be sealed much more perfectly against contamination than any mechanical connection. In the arrangement of Figure 5, the front and rear axle units 86 are permanently sealed and connected through flexible conduits 88 and rigid piping 90 with a supply reservoir 92 which may or may not also house the pumping unit for the body. In either event, all the pumping units are completely immersed in oil, which materially contributes to the protection of the moving parts against wear or corrosion. In the arrangement of Figure 5 it is never necessary to secure any access whatever to units 86. This is advantageous because, on account of their exposed condition, they are apt to become heavily coated with dirt, and access to them would mean the inconvenience of cleaning or the risk of contamination, or both. Unit 72 is housed under the hood where it is much more readily accessible and better protected.

Figure 7:
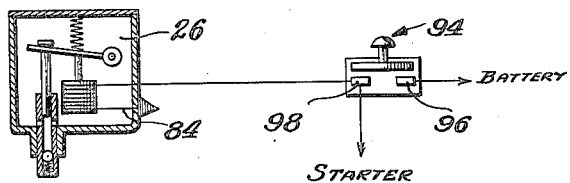
Figure 7 is a wiring diagram showing one set of connections for the joint operation.
Figure 8:
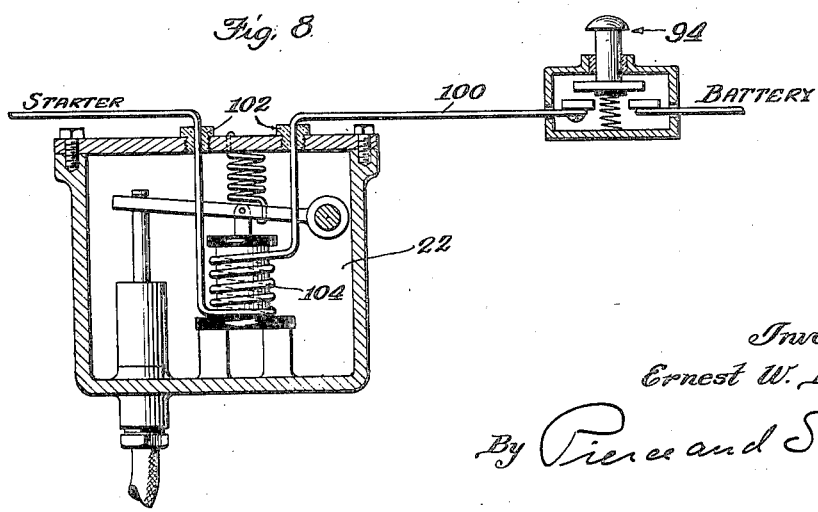
Figure 8 is a more or less structural showing of a different set of connections.

Referring now to Figures 6, 7 and 8, I have indicated pumping units 22, 26 and 28, which may be identical with those shown in Figure 2, but the supply of electrical energy from battery 78 is delivered to them through the starter switch 94, so that the operation of the lubrication units is automatically conditioned on use of the starter by the operator. The battery connection leads to one contact 96, and parallel connections from the other contact 98 lead respectively to the starter and to each of the pumping units.

In the arrangement of Figure 8, the operation of the pumping unit is conditioned not only upon use of the starter switch by the operator, but on the operativeness of the starter itself, at least to the extent that it will draw current from the battery. Thus, any serious defect in the electrical portion of either the lubricating means or the starter would automatically prevent improper or unnecessary operation of the other unit. For instance, an open circuit in the starter would not only make it necessary to repair the same, but repeated operation of switch 94 in discovering the defect or repairing it would not result in excessive lubrication. Similarly, a severe short circuit in the starter would burn itself out and become an open circuit so as to produce the same result. Any interruption of the current connections through to the heavy cable 100, which is shown in Figure 8 as entering the casing through insulators 102 and encircling the solenoid with relatively few turns 104, would make it impossible to operate the starter, so that the car would not be driven very long without lubrication.

Without further elaboration the foregoing will so fully explain the gist of my invention, that others may, by applying current knowledge, readily adapt the same for use under various conditions of service. It will, for instance, be obvious that the different cylinders may be made of different capacities to suit the requirements of the bearings to be lubricated. A convenient way of doing this on the structure shown is by varying the effective level of passage 52. Thus the left hand cylinder in Figure 4 has about 10% and the right hand cylinder about 30% more capacity than the central cylinders. This and many other adaptations may readily be made by those skilled in the art without eliminating certain features which may properly be said to constitute the essential items of novelty involved, which items are intended to be defined and secured to me by the following claims.

I claim:

1. The combination with an automotive vehicle chassis comprising an axle and a frame supported by said axle and movable relatively thereto, of means for lubricating bearings on said axle comprising a pump carried by said axle, a supply tank carried by said frame, a conduit for establishing communication between said supply tank and said pump, said conduit comprising means for compensating for relative movement between said frame and axle, and means distinct from said conduit for actuating said pump.

2. The combination with an automotive vehicle chassis comprising an axle and a frame supported by said axle and movable relatively thereto, of means for lubricating bearings on said axle, comprising a pump carried by said axle, a conduit extending from said frame to said axle for forwarding lubricant to said pump, and electric means extending from said frame to said axle for actuating said pump.

3. The combination with an automotive vehicle chassis comprising an axle and a frame supported by said axle and movable relatively thereto, of means for lubricating bearings on said axle, comprising a pump, electric means for actuating said pump, a control element for the operation of the vehicle, and automatic means for delivering current to said electric means upon use of said control element by the driver.

4. The combination with an automotive vehicle chassis comprising an axle and a frame supported by said axle and movable relatively thereto, of means for lubricating bearings on said axle, comprising a pump, electric means for actuating said pump, a starter switch for starting the engine, and automatic means for delivering current to said electric means upon use of said starter switch by the driver.

5. The combination with an automotive vehicle chassis comprising an axle and a frame supported by said axle and movable relatively thereto, of means for lubricating bearings on said axle, comprising a pump, electric means for actuating said pump, a different electrical unit on the frame connected in series with said pump actuating means, and a control switch for said unit and means.

6. The combination with an automotive vehicle chassis comprising an axle and a frame supported by said axle and movable relatively thereto, of means for lubricating bearings on said axle, comprising a pump, electric means for actuating said pump, and means conditioned for operation upon the operativeness of a different electrical unit on the frame for supplying current to said pump actuating means.

7. Lubricating means for motor vehicles having a plurality of bearings, comprising a plurality of lubricant receptacles located in different places, an individual dispensing device in each receptacle, said dispensing devices being submerged in the oil in each receptacle, connections for actuating all said devices from a single power source, a single inlet, and connections for filling all said receptacles through said inlet, said filling means being operable irrespective of the position of said dispensing means.

8. A multi-cylinder lubricant pump comprising a plurality of duplicate cylinder bodies, duplicate plungers moving through identical strokes in said cylinders, said cylinders having inlet ports intermediate the ends of the plunger stroke, different cylinders having their inlet ports at different levels to pump different charges per stroke.

In witness whereof, I hereunto subscribe my name this 11th day of July, 1925.

ERNEST W. DAVIS.